United States Patent
Sinai et al.

(10) Patent No.: US 9,386,659 B2
(45) Date of Patent: Jul. 5, 2016

(54) FULLY INTEGRATED INTELLIGENT LIGHTING MODULE

(76) Inventors: Saman Sinai, Commerce, CA (US); Benjamin Pouladian, Commerce, CA (US)

(*) Notice: Subject to any disclaimer, the term of this patent is extended or adjusted under 35 U.S.C. 154(b) by 546 days.

(21) Appl. No.: 13/486,438

(22) Filed: Jun. 1, 2012

(65) Prior Publication Data
US 2013/0320861 A1 Dec. 5, 2013

(51) Int. Cl.
*H05B 37/02* (2006.01)
*H05B 33/08* (2006.01)

(52) U.S. Cl.
CPC ............ *H05B 37/02* (2013.01); *H05B 33/0803* (2013.01); *H05B 37/0218* (2013.01); *H05B 37/0227* (2013.01); *H05B 37/0272* (2013.01)

(58) Field of Classification Search
CPC .. H05B 37/0272; H05B 37/034; H05B 37/02; H05B 33/0803; H05B 37/0218; H05B 37/0227; H05B 37/0245; Y02B 70/325; Y02B 90/2653
See application file for complete search history.

(56) References Cited

U.S. PATENT DOCUMENTS

| | | | |
|---|---|---|---|
| 8,035,320 B2* | 10/2011 | Sibert | 315/312 |
| 8,138,690 B2* | 3/2012 | Chemel et al. | 315/318 |
| 8,519,566 B2* | 8/2013 | Recker et al. | 307/64 |
| 8,729,446 B2* | 5/2014 | Verfuerth | 250/205 |
| 8,890,435 B2* | 11/2014 | Bora et al. | 315/292 |
| 9,049,753 B1* | 6/2015 | Wassel | H05B 37/02 |
| 2010/0283605 A1* | 11/2010 | Nevins | 340/540 |
| 2011/0121654 A1* | 5/2011 | Recker et al. | 307/66 |
| 2013/0234595 A1* | 9/2013 | Martin et al. | 315/87 |
| 2014/0028200 A1* | 1/2014 | Van Wagoner et al. | 315/158 |
| 2014/0244044 A1* | 8/2014 | Davis et al. | 700/276 |

* cited by examiner

*Primary Examiner* — Michael Zarroli
(74) *Attorney, Agent, or Firm* — OmniLegal Group; Omid E. Khalifeh

(57) ABSTRACT

One embodiment of a fully integrated intelligent lighting module with built-in heat sink allows conventional electrodeless discharge lamps, LED, or electrodeless plasma lamps to be converted into intelligent electrodeless discharge lamps or electrodeless plasma lamps [with minimal effort]. Such a module may be comprised of a driver for an electrodeless discharge lamp or electrodeless plasma lamp capable of operating from 120-277V at 50/60 Hz as well as 347V and 480V in different models; a dimming chip; a sensor chip with clock to monitor the time and power used; a ROM module to store the data collected by the sensor chip; on-board non-volatile memory; a wireless communication module; and an external display and programming controls. Such a module allows users who install it into any pre-existing "dumb" light fixture to [quickly and easily] convert that fixture into an "intelligent" one.

6 Claims, 8 Drawing Sheets

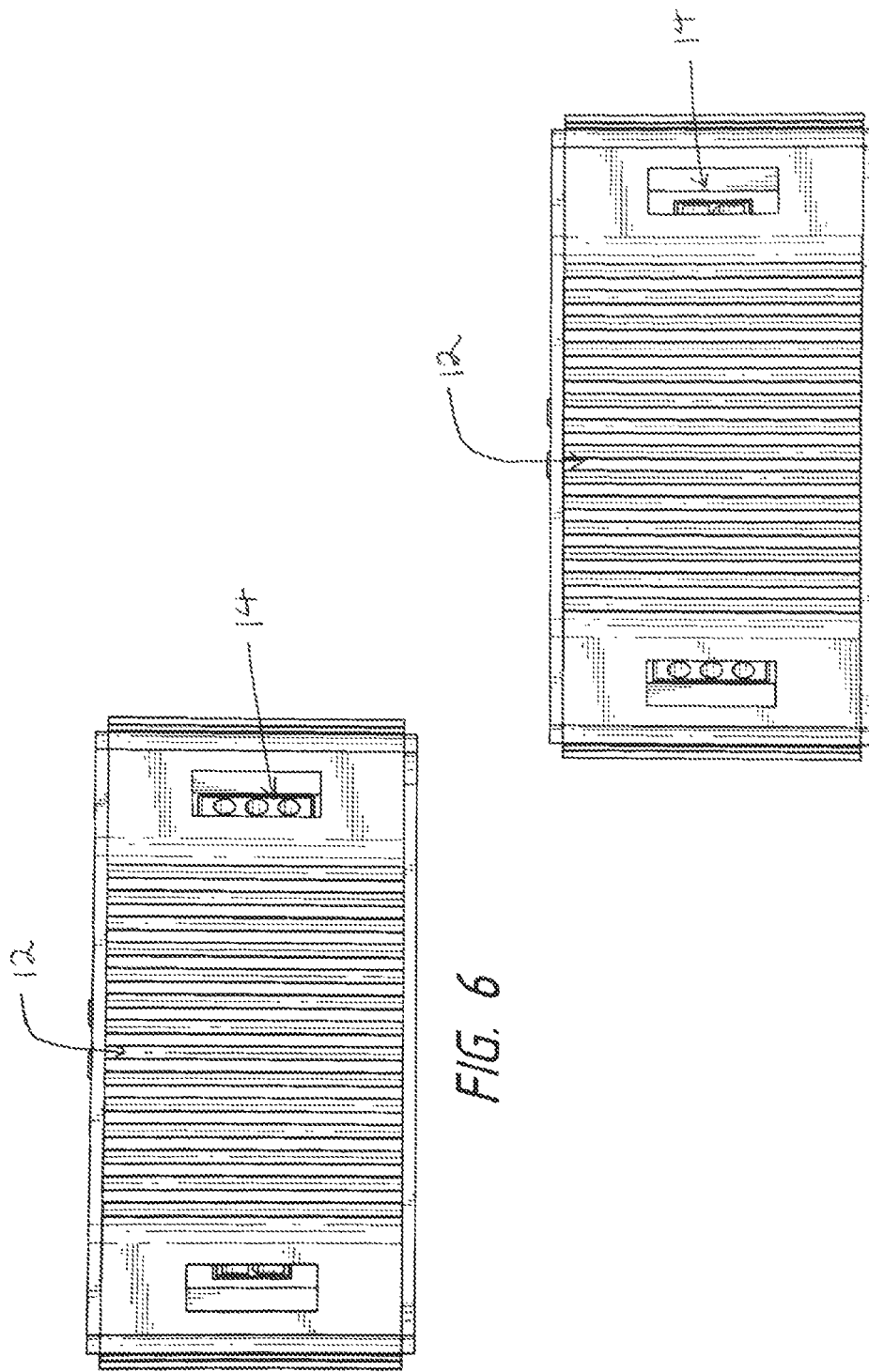

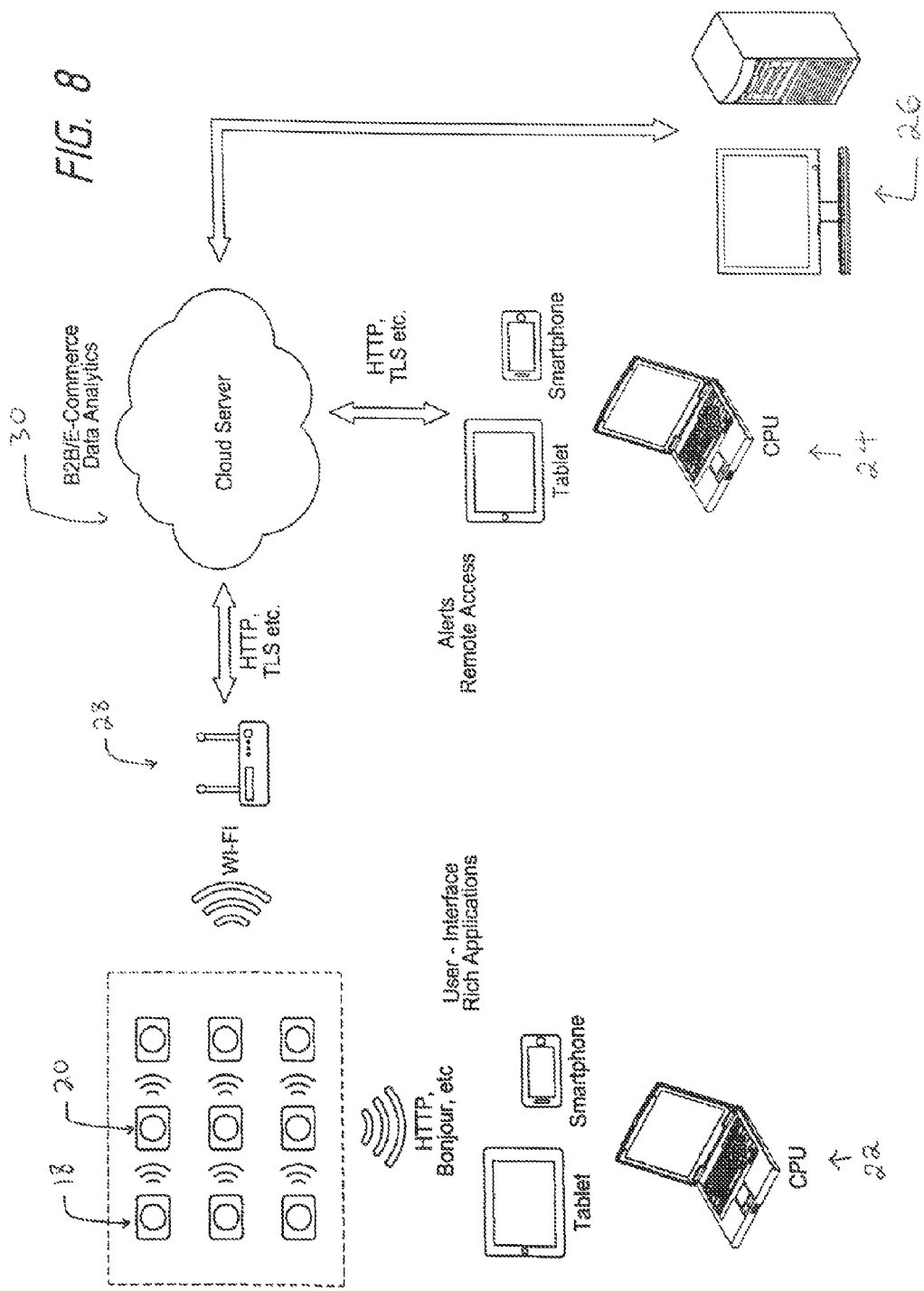

FULLY INTEGRATED INTELLIGENT LIGHTING MODULE

CROSS-REFERENCE TO RELATED APPLICATIONS

None

BACKGROUND

The following is a tabulation of some prior art that presently appears relevant:
U.S. Patents

| Pat. No. | Kind Code | Issue Date | Patentee |
| --- | --- | --- | --- |
| None found | | | |

U.S. Patent Application Publications

| Publication Number | Kind Code | Publ. Date | Applicant |
| --- | --- | --- | --- |
| 2003/0090889 | A1 | May 15, 2003 | Wacyk et al. |
| 2012/0078635 | A1 | Mar. 29, 2012 | Rothkopf et al. |

Foreign Patent Document
   None found
Nonpatent Literature Documents
   None found

NOTICE OF COPYRIGHT AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

DISCUSSION OF THE RELATED ART

Wireless technology continues to play a bigger role in the people's day-to-day lives. What was once considered unconventional has now become commonplace. Wireless communication between electronic devices is changing the way people think about technology and its ability to run businesses more safely, efficiently, and intelligently.

One way wireless technology is bringing about change is through its integration with lighting fixtures. By allowing lighting fixtures to seamlessly communicate information to one another, wireless transmitters and receivers are changing the way commercial and residential structures are lit.

The seedling phase of this technology means there are few ways this can be accomplished. Currently, there is only one very limited known device combining wireless technology and lighting fixtures. To date there have been two proposed methods of taking an existing light fixture and endowing it with ability to communicate wirelessly and intelligently with other electronic devices.

Systems that incorporate wireless and intelligent technology into existing light fixtures have numerous advantages. These systems are designed to minimize the consumption of electricity and minimize cost to the end-user. Other advantages include an ability to program systems from a remote location. One computer may wirelessly project information and collect data from fixtures in such systems making them desirable for monitoring and controlling a large number of fixtures in a given space.

Intelligent lighting systems comprise a number of useful features for the end user. These systems allow management of individual fixtures by performance lighting predictions. Predictions which may be based on past performance of the same system. In some embodiments, they may use sensors for intelligently managing lighting environments. While in others, they may contain microprocessors or other intelligent control devices to monitor the various system conditions such as the number of hours a given fixture has been used. In others, they may use both.

Such systems have many useful implications, however consumer access to intelligent lighting systems is presently limited to those consumers who can afford to replace all the figures in a given space with brand new light fixtures. There is no known device capable of updating preexisting light fixtures to allow for intelligent operation thereof.

The information that an intelligent lighting system can collect, store, and communicate provides useful feedback to the end-user. An intelligent lighting system may collect data on how many hours a particular fixture has been on throughout its life. This data can then be compared to stored data about the useful life of the fixture. For example, the system can then calculate and notify the user how much life is left in a given fixture and make suggestions for when a fixture must be changed.

Intelligent lighting generates savings in installation and design costs. More specifically, these systems save money associated with having a lighting grid comprised of multiple connected fixtures operated by single switch. Traditional lighting fixtures must be wired directly together before they can be operated by a single light switch. However, a light fixture that is enabled with intelligent technology can communicate to another similarly enabled fixture wirelessly. Wireless technology allows the intelligent fixture to create a virtual grid unhampered by the need for wires to connect all of the fixtures within it consequently eliminating the expense associated with connecting fixtures to form a grid.

Conventional intelligent lighting systems are not fully-integrated. In conventional intelligent lighting systems, a multitude of electronics must be connected directly to one another with cables often spanning great distance. Thus, substantial expense is incurred as trained professional must be hired to wire the sensors, processors, and wireless networking technology necessary to make the conventional intelligent lighting systems work.

Existing smart LED fixtures have numerous drawbacks one of which is cost. The exorbitant cost of LED technology has prevented those otherwise interested in intelligent lighting fixtures from utilizing the technology. Part of this cost related to the recent advent of LED technology in the commercial lighting arena. Part of it can be traced to present fixture design and the fact consumers must purchase an entirely new set of fixtures to incorporate an intelligent lighting scheme.

Intelligent lighting need not be limited in these ways. Older lighting fixtures could also benefit from intelligent lighting. Nevertheless, presently available systems make it so these features are only available to those who use LED lighting and are willing to replace all of their existing light fixtures.

The numerous types of intelligent lighting systems heretofore known suffer from a number of disadvantages:
   (a) The known systems are comprised of multiple parts;

(b) The known system require significant design costs;
(c) The known systems require significant installation costs;
(d) Installing the known systems are time consuming;
(e) The known systems are designed to work specifically with LED lights and are not suitable for use with more efficient and cost effective lighting fixtures;
(f) The known systems do not allow for simple conversion from an existing non-intelligent fixture to an intelligent one;
(g) Currently existing electrodeless discharge lamp and electrodeless plasma lamp drivers do not allow for dimming below 20%;
(h) There does not exist a module that can be installed into an electrodeless discharge lamp or electrodeless plasma lamp allowing it to monitor the number of hours the lamp has been used;
(i) There does not exist a module that can be installed into an electrodeless discharge lamp or electrodeless plasma lamp allowing it to store information about the lamps activity;
(j) There does not exist a module that can be installed into an electrodeless discharge lamp or electrodeless plasma lamp allowing that lamp to communicate with other lamps that have a similar module installed;
(k) There does not exist a module that can be installed into an electrodeless discharge lamp or electrodeless plasma lamp making that lamp programmable;
(l) There does not exist a module that can be installed into an electrodeless discharge lamp or electrodeless plasma lamp that will automatically detect a failure in the lamp and electronically notify an individual of the failure;
(m) There does not exist a module that can be installed into an electrodeless discharge lamp or electrodeless plasma lamp that displays a digital readout on the number of hours that the fixture has been on; and
(n) There does not exist a module that can be installed into an electrodeless discharge lamp or electrodeless plasma lamp that has its own built-in heat sink.

SUMMARY

In accordance with one embodiment an integrated lighting module is comprised of several parts encased in a single housing that when installed in an electrodeless discharge lamp, light emitting diode (LED) lamp, or electrodeless plasma lamp fixture, will make that lamp operate intelligently.

Several advantages of one or more aspects are to provide an intelligent lighting system that may be utilized with LED, electrodeless discharge lamps, or electrodeless plasma lamp. These and other advantages of one or more aspects will become apparent from the consideration of the ensuing description and accompanying drawings.

A fully integrated intelligent lighting module allows LED, conventional electrodeless discharge, or electrodeless plasma lamps to be converted into intelligent LED, electrodeless discharge lamps, or electrodeless plasma lamps with minimal effort. In one embodiment, such a module may be comprised of a driver for an electrodeless discharge lamp or electrodeless plasma lamp capable of operating from 120-277V at 50/60 Hz as well as 347V and 480V in different models; a dimming chip; a sensor chip with clock to monitor the time and power used; a ROM module to store the data collected by the sensor chip; on-board non-volatile memory; a wireless communication module; and an external display and programming controls. The module may also contain a plurality of ports on the outside of the device allowing different sensing and data collection devices to be connected.

In one embodiment, the module may be comprised of a switching-mode power supply (SMPS) which may be used to supply power to LED lights. The same module may also comprise a microcontroller, a WiFi receiver and transmitter, a transmitter/receiver for radio-frequency (RF) applications that require a low data rate, long battery life, and secure networking. In one embodiment of an intelligent lighting module, the same module may also comprise a microwave sensor.

In one other embodiment, the module may be comprised of an electronic ballast which may be used to supply power to electrodeless discharge lamps or electrodeless plasma lamps. The same module may also comprise a microcontroller, a WiFi receiver and transmitter, a transmitter/receiver for radio-frequency (RF) applications that require a low data rate, long battery life, and secure networking. In one embodiment of an intelligent lighting module, the same module may also comprise a microwave sensor.

The module may contain a built-in heat sink. In one embodiment the casing of the module will be capable of acting as a heat sink. This may be achieved through the use of grids and a silicone rubber compound. The grids will line the outer surface of the module while the silicone rubber compound may be poured on top of the chips located therein.

In one embodiment, the chemical composition of the silicone rubber compound will contain no solvents for ease of use on production lines.

In one embodiment, the composition will have low viscosity so that it may flow easily in and around complex parts.

In one embodiment, the cure rate of the composition may be accelerated by heat.

In one embodiment, the composition will cure in deep sections or enclosed assemblies without exothermic activity and with minimal shrinkage.

In one embodiment, the composition will be reversion resistant and hydrolytically stable.

In one embodiment, the composition will retain elastomeric properties at temperature up to 204 degrees Celsius.

In one embodiment, the silicone rubber compound may be comprised of a two component Room Temperature Vulcanizing (RTV) commonly used for potting and encapsulation, particularly where flammability is a concern. It may be used in a one to one ratio by weight or by volume. It may be dark gray in color and have an easily pourable viscosity of approximately 1300 cps.

In one embodiment, the module may be programmable with hi-low dimming set points. The set points may be store onboard in non-volatile memory.

In one embodiment, the wireless communication module within the fully integrated intelligent lighting module may be an 802.15.4 platform that is compliant with communications protocols such as those sold under the trademark ZigBee®. Other wireless communication modules may also be used. For example, the wireless communication module may be capable of sending and receiving data wirelessly using Wi-Fi or cellular networks. In another embodiment of the intelligent lighting module, said module may both ZigBee® and WiFi communications modules.

One embodiment of the intelligent lighting module would utilize a Wi-Fi Microcontroller to wirelessly network the modules together. An example of such a controller is the 88MC200 microcontroller sold under the trademark Marvell®. Such a microcontroller may have features such as IEEE 802.11n, antenna diversity, beam forming, access-point mode, and Wi-Fi direct. This particular micro controller comprises a 200 MHz max CPU, 512 KB SRAM, serial I/O interfaces which include UART(4), SPI(3), and I2C(3). Said microcontroller may also comprise high-speed connectivity interfaces for SDIO and USB-OTG with integrated PHY.

Another example of a microcontroller that may be utilized in one embodiment of the intelligent lighting module is an IEEE802.15.4 standard-compatible integrated radio frequency (RF) transceiver and wireless microcontroller. Such a microcontroller may have Low-power, IP-based wireless connectivity enabled by the-open source JenNet-IP networking software or other low powered communications protocols such as ZigBee®.

thisUsing a microcontroller and allowing the intelligent lighting module to have access to the internet will allow for a variety of advantages of tradition "dumb" ballasts. Users will now be able to control a given lighting network remotely through a wireless-enabled computer, tablet, or smart-phone. Every fixture with it's own wireless router could potentially have it's own IP address. Cloud-based servers may also be used to access the fixtures or a particular fixture remotely. Furthermore, the module may collect data from the fixture and transmit that data over the internet to be stored in the cloud. Control of the fixture over the internet will allow users to create networks wirelessly, control said networks, and turn on or off particular fixtures. Furthermore, this technology will enable the user to remotely access information about the network of light fixtures or a particular fixture. Such information may include that which is collect from a sensor, as well as diagnostics on the fixture, and alerts.

Furthermore, the use of such microcontrollers allows the connected fixture to act as a Wi-Fi access point so that users can communicate remotely with the fixture using their computers, smart phones, or tablets without need for a designated home network. This will enable the fixture to connect to a home-network while offering its own network at the same time. Each network may be then programmed to provide distinct services. An added benefit is increased Wi-Fi signal reception within the facility containing these intelligent fixtures.

With respect to the software used to communicate between a computer, tablet, or smart phone and the light fixture, using a microcontroller such as the microcontrollers heretofore described and similar devices, the software will allow programmers to develop and use new applications around the capabilities offered by the intelligent lighting module's sensors and controls, as well as data and information available from the fixture itself, and the internet. For example, the fixture with the intelligent lighting module may be able to search the web for data on weather and lighting conditions and then use software to optimize the way the fixture operates.

In other embodiments, sensors may be plugged directly into the intelligent lighting module. A variety of different sensors may be used to collect different types of data and then relay them to a processor located within the lighting module. Examples of the types of sensors which may be used include, but are not limited to, occupancy sensors, microwave sensors, and temperature sensors.

In another embodiment, the sensor may be an ambient lighting sensor which detects how much ambient daylight is detected. This information may be used to adjust the light output of each fixture based on how much illumination is needed. The desired level of illumination may be set wirelessly using a software program which then relays the programmed set point to the intelligent fixture. The set-point may also be entered directly into the intelligent lighting module using the keypad and controls located on the surface of the device.

Other types of sensors, which may be used, include, but are not limited to spectrometers, radiometers and photometers. Such sensors may also include thermal sensors, chemical sensors, electromagnetic sensors, acoustic sensors, air pollutant sensors, and humidity sensors.

The data relayed by these sensors and stored on the module's memory will enable the fixture to operate more efficiently. For example, with typically low occupancy areas vacant up to 98% of the time, one embodiment of a fully integrated intelligent lighting module would store data on what times of day the particular area is occupied and when it is vacant. The motion detector relays information about the presence of an individual to the integral processor or microcontroller. The information about the presence of and individual along with the time of day that they are detected may stored on the integral memory, sent via the internet to be stored on the cloud, or both. The processor may then analyze the data and determine during what times of the day a particular area is most occupied and then adjust light levels accordingly.

In the case where the data is stored in the cloud, proprietary software may be used to analyze the data and program the light fixtures to optimize efficiency and specifically program operation to meet the users demands.

In one embodiment, lighting control of a plurality of lighting fixtures having the fully integrated intelligent lighting module installed may be provided. In another embodiment, only certain fixtures in a given space will be turned on while others will remain off in order to provide illumination precisely where it is needed. In a simple incarnation, a sensor device may be connected directly to the intelligent lighting module in order to detect whether activity is occurring in the area that is being illuminated by a particular fixture.

In another embodiment, the fixtures may be networked together based on where they are located (a particular room, a particular floor in the building, a particular part of a city, etc.) so that these fixture may be controlled (dimmed, brightened, turned on and off, programmed, etc.) all at once.

In one embodiment, sensing and control data may be transmitted between fixtures, sensors, power switches, and computers. Software applications may then be created to use this data to conserve energy by lighting more efficiently. This could mean turning off fixtures in areas where there is no occupancy detected. In another embodiment, this could also mean dimming light fixtures in areas which require little or no illumination. There are a wide variety of ways in which the transmitted data may be used in order to conserve energy and reduce lighting costs. The preceding examples are not an exhaustive list and are not meant to be limiting as those skilled in the art to which this invention pertains will be able to devise other forms thereof.

In one embodiment, the lighting module may communicate to the end user information regarding the status of the fixture. Such information may include, but is not limited to, energy consumption, power quality, ballast failure and lamp failure.

In one aspect, the operational parameters may be set using front-end software. Such software would allow the end-user to control when and to whom the data collected by the module would be communicated.

In one embodiment, control parameters may be entered directly into the module using a keypad and screen on the surface of the module. The screen may also be used to provide digital readouts about the status of the fixture (how many hours the lamp has been on, how long before the lamps needs to be replaced, what the current operating parameters are, etc.).

In one embodiment, software may be used to group particular fixtures together into zones. Different functions of the fixture may also be controlled. These include, but are not limited to, dimming the fixture, turning it on or off, commanding the fixture to turn on to a particular level or behave in a particular manner given the time of day, the amount of ambient light detected, whether or not there is a person in the room, if there is an emergency, etc.

In one aspect, the module may be connected to a multilevel electrodeless discharge lamp such as the model D511 luminaire sold under the trademark Deco®. In which case, sensor data could be used to instruct the fixture telling it how many of the lamps should be turned on. When maximum illumination is desired, all of the lamps can be turned on. However, if the sensor does not detect the presence of any individuals around the fixture, the module may be programmed to go into a power conservation mode. In this case, the minimal number of lamps would remain on or all may be turned off.

In another embodiment, the module can be programmed to turn on only one, or both of the D 511's lamps depending on what parameters are communicated to the module and what information is collected by the occupancy sensor on the D 511 fixture.

In another embodiment, a lighting program may be used to control fixture behavior in the case of an emergency. At the onset, information about the state of emergency may be relayed to a computer. The computer then transmits a wireless signal to fixtures containing the integrated module telling them to flash repeatedly. The computer may program all of the fixtures in a particular building to behave this way or it may specify fixtures in a particular zone where people may be affected by the emergency.

In an embodiment, sensors plugged directly into the module could detect the occurrence of an emergency. For example, such as sensor may be one that detects hazardous chemicals. Once the chemicals are detected, the sensor would relay this information to the module's processor, wirelessly to the cloud, or both. The proprietary software in the intelligent lighting module's microprocessor and stored onto the cloud could then instruct the fixture to blink on and off in a predetermined pattern.

Furthermore, the module processor may notify an individual that an emergency protocol has been activated. For example, once the sensor detects a hazardous chemical and relays that information to the processor, the processor may use the integrated wireless communication device to send a message (e-mail, text message, etc.) to a designated individual.

In another embodiment, the modules can also be programmed to relay data to the proper authority (police, fire department, security company, etc.) to notify them that an emergency protocol has been initiated.

In one aspect, the module may be programmed to increase light to higher than normal levels to aid in an investigation.

In one embodiment, the integrated module may be affixed to a streetlamp. Conventional streetlamps are "dumb." They turn on when a photocell attached to them reacts to the darkness, and off when the sun comes up. Attaching the fully integrated module would make the lamps "smart." Accordingly, they may, for example, be programmed to come on at particular hours of the day, and then dim to conserve energy at other times. Now that they can access data over the internet, they may be programmed to check weather report and modify lighting activity to run more efficiently and optimize performance. Because the integrated module allows the streetlamp to send and receive data, such programming may be done remotely and wirelessly.

In yet another embodiment, the proprietary software would allow access to the network of intelligent light module-enabled fixtures to at least two distinct sets of users. By way of example, they will be referred to as the smart licensor and the smart licensee. In this embodiment, when the smart licensee uses the proprietary software to wirelessly communicate with the fixtures, they will be able to program them to meet their personal lighting requirements. The smart licensor will also have access to all of the same programming options. However, the proprietary software installed in the lighting modules, computers, wireless electronic devices, and the cloud in this embodiment, will allow the licensor more control than the licensee. More specifically, the licensor will be able to override all of the commands made through the proprietary software by the licensee.

Furthermore, the inventors foresee that in other embodiments, there may be a variety of different users all with differing levels of access and control over the intelligent lighting module. Levels of control may vary anywhere from absolute control over the entire system, as with the smart licensor, or they may be narrowly tailored so that one user may only have access to module in small predefined region.

In one embodiment, the module will be capable of receiving information from a mobile device such as a cell phone. Once a particular cell phone is detected, the module may adjust lighting conditions to suit the owner of the mobile device. The aforementioned preferences would be entered into a particular program installed in both the module and the mobile device. Or they may be programmed directly into the cloud which would then inform the fixture or fixtures that a particular device has been detected and instruct the fixtures how they should light given the mobile users preprogrammed choices. In another aspect, the mobile device may be a sensor that the individual wears on their person.

In one aspect, the module would collect data on the usage of a particular fixture or series of fixtures throughout the day. Such data may include, but is not limited to, the number of hours a particular fixture is on and during what time of the day that fixture is most commonly used. Past performance of the fixture could be stored within the module or communicated wirelessly to an individual using a computer or other electronic device capable of receiving such wireless data. This data could then be used to enhance performance such as by reducing the amount of electricity used by a particular facility.

Accordingly several advantages of one or more aspects are as follows: Other advantages of one or more aspects will be apparent from a consideration of the drawings and the ensuing description.

The description of the invention which follows, together with the accompanying drawings should not be construed as limiting the invention to the example shown and described, because those skilled in the art to which this invention pertains will be able to devise other forms thereof.

The reader will see that the fully integrated intelligent lighting module can be used to quickly, easily, and inexpensively convert a "dumb" light fixture into an "intelligent" fixture with the use of a single device. This module can then be upgraded with sensors and other data collections tools by plugging them into ports on the outside of the module in one embodiment. In other embodiments, the collection tools may be integral to the module. Furthermore, the use of such an intelligent light module will allow the end-user more control over where, when, and how a particular light fixture is turned on and off. This will translate into energy savings for the user and such efficient consumption of energy will directly benefit the environment.

ADVANTAGES

From the description above, a number of advantages of some embodiments of a fully integrated intelligent lighting module become evident:

(a) Most of the components necessary to make an intelligent lighting system are contained in a single module;
(b) The lack of wiring to create a grid of light fixtures translates to savings in design costs for the end-user;
(c) Using a fully integrated intelligent lighting module will save in installation costs typically associated with intelligent lighting systems;
(d) Installing a fully integrated intelligent lighting module will take considerably less time than conventional intelligent lighting systems;
(e) The fully integrated intelligent lighting module may be designed to work with electrodeless discharge lamps, LED, or electrodeless plasma lamps;
(f) The fully integrated intelligent lighting module may be connected to a wide variety of sensing and data collecting devices;
(g) The fully integrated intelligent lighting module can communicate wirelessly with other intelligent lighting modules, to personal computers, and other wireless-communication-enabled electronic devices;
(h) The fully integrated intelligent lighting module will allow the electrodeless discharge lamp or electrodeless plasma lamp it is connected to dim below 20%;
(i) The fully integrated intelligent lighting module can be installed into an electrodeless discharge lamp, LED, or electrodeless plasma lamp allowing it to monitor the number of hours the lamp has been used;
(j) The fully integrated intelligent lighting module can be installed into an electrodeless discharge lamp, LED, or electrodeless plasma lamp allowing it to store information on the lamps activity;
(k) The fully integrated intelligent lighting module can be installed into an electrodeless discharge lamp, LED, or electrodeless plasma lamp making that lamp programmable;
(l) The fully integrated intelligent lighting module can be installed into an electrodeless discharge lamp, LED, or electrodeless plasma lamp and will automatically detect a failure in that lamp and wirelessly transmit this information to an individual, store it as data on the module, or store it on the cloud;
(m) The fully integrated intelligent lighting module can display a digital readout on the number of hours that a particular electrodeless discharge lamp, LED, or electrodeless plasma lamp has been on;
(n) The fully integrated intelligent lighting module has it's own built-in heat sink; and
(o) The fully integrated intelligent lighting module eliminates the need to go directly to the fixture for determining whether the lamp is functioning properly.

These and other advantages of one or more aspects will become apparent from consideration of the ensuing description and accompanying drawings. Although the description above contains many specificities, these should not be construed as limiting the scope of the embodiments but as merely providing illustrations of some of several embodiments. For example, the intelligent lighting module may have integral data collection sensors in one embodiment while in another embodiment the sensors may be added by plugging them into ports on the outside of the module. Thus the scope of the embodiments should be determined by the claims that are appended and their legal equivalents, rather than by the examples given.

The description of the invention which follows, together with the accompanying drawings should not be construed as limiting the invention to the example shown and described, because those skilled in the art to which this invention pertains will be able to devise other forms thereof within the ambit of the appended claims.

DESCRIPTION OF THE DRAWINGS

Figures

FIG. 6 shows a scaled left-side view thereof;
FIG. 7 shows a sealed right-side view thereof;
FIG. 8 shows a network of intelligent light fixtures capable of being operated wirelessly because they have the fully integrated intelligent lighting module installed.

Figure 1:
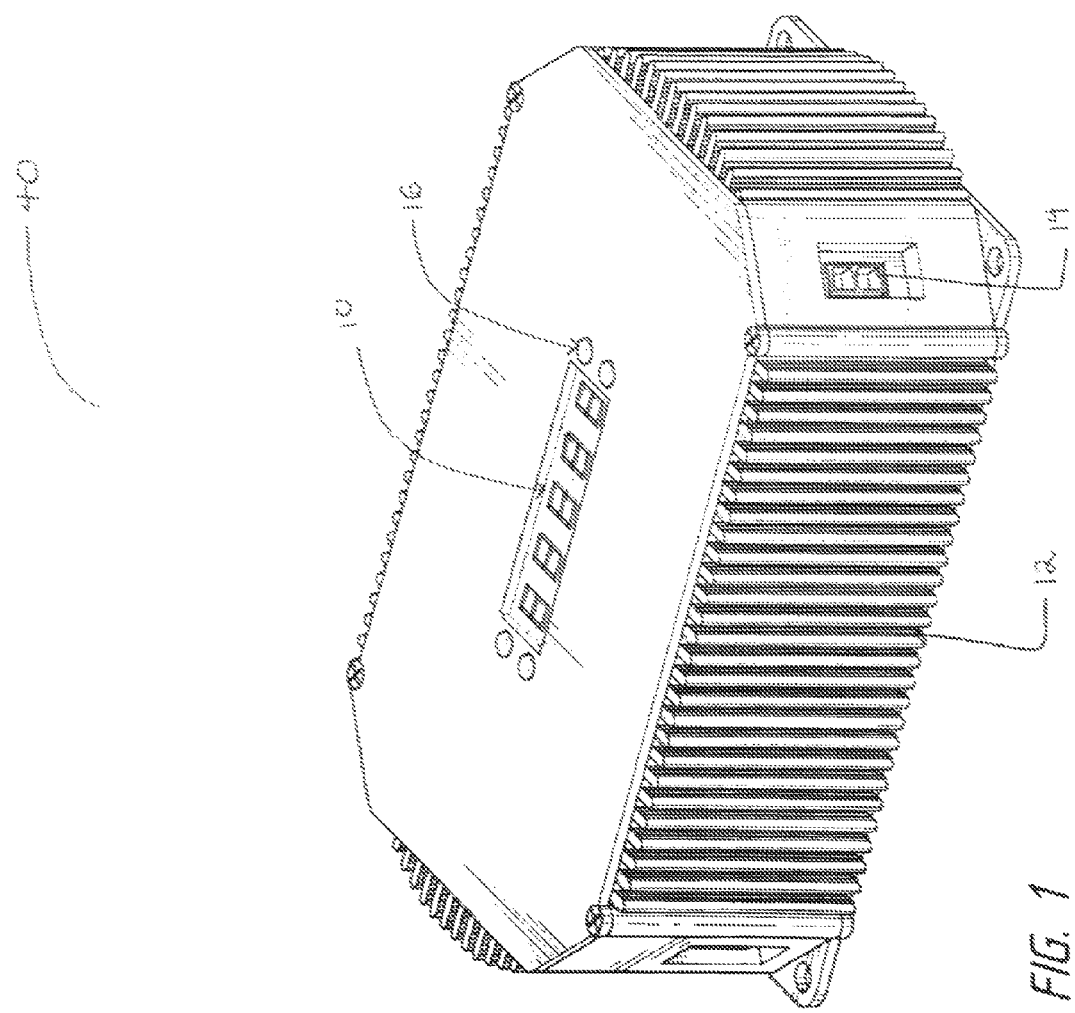
FIG. 1 shows a front perspective view of a fully integrated intelligent lighting module.

| Reference Numerals | | | |
|---|---|---|---|
| 10 | external display | 12 | heat sink |
| 14 | external sensor port | 16 | external control button |
| 18 | first light fixture with intelligent lighting module installed | 20 | second light fixture with intelligent lighting module installed |
| 22 | first electronic device | 24 | second electronic device |
| 26 | third electronic device | 28 | wireless access point |
| 30 | cloud server | | |
| 40 | fully integrated intelligent lighting module | 42 | microcontroller |
| 44 | memory | 46 | receiver |
| 48 | transmitter | 49 | power means |
| 50 | lamp | | |

DETAILED DESCRIPTION

Illustrative embodiments of the invention are described below. The following explanation provides specific details for a thorough understanding of an enabling description for these embodiments. One skilled in the art will understand that the invention may be practiced without such details. In other instances, well-known structures and functions have not been shown or described in detail to avoid unnecessarily obscuring the description of the embodiments.

FIG. 8 illustrates one embodiment of an intelligent lighting control system. One embodiment may include a fully integrated intelligent lighting module 40 electronically connected to a first light fixture 18. Said first light fixture 18 may be communicatively coupled to a second light fixture 20 which is also electronically connected to a fully integrated intelligent lighting module 40. An illustrated example of one embodiment of the possible coupling of the module 40 to a light fixture 18, itself coupled to a light source—or lamp 50—is provided as FIG. 9. With continued reference to FIG. 8, In one embodiment, both of said light fixtures may be communicatively coupled to a cloud server 30. In one embodiment, said light fixtures may communicate to the cloud server 30 via a wireless access point 28. Both of said light fixtures may be comprised of light emitting diodes (LED), electrodeless discharge, or electrodeless plasma lamps 50. One embodiment may also include a first electronic device 22 communicatively coupled to said first 18 and said second 20 light fixtures. In one embodiment, the first electronic device may be a wireless communication device, such as a cellular mobile phone, lap-top, or desktop computer capable of connecting to the server 30 or either of said light fixtures.

Said electronic devices may include a proprietary user interface. A variety of lighting commands may be stored in either one of the electronic devices, or both. By way of example and for illustration purposes only, said lighting command may be to turn on said light fixtures when an integral occupancy sensor detects the presence of an individual. This lighting command may correspond to a sequence of executable commands for turning on a particular light fixture or set of light fixtures. In contrast, an alternate lighting command may be for said lighting fixtures to remain off even though the presence of an individual is detected by said occupancy sensor. Said electronic devices may then transmit lighting commands to the cloud server 30 which may use a proprietary command recognition software that is configured to receive said commands and transmit them to said first and second light fixtures thereby enabling them to perform said lighting commands.

It should be understood by those of ordinary skill in the art, that said proprietary software may be used to execute a wide variety of commands or macros different from those mentioned above. By way of example and for the purposes of illustration only, the software may be used to program certain smart fixtures to turn on and off repeatedly if the occurrence of an emergency is detected. This emergency may be the presence of a certain and noxious or toxic chemical detected by a sensor and communicated to the intelligent lighting module 40.

All of the light fixtures with a fully integrated intelligent lighting module 40 installed will be capable of communicating to one another. Therefore, if a dangerous chemical is detected by a fixture in one room, it may transmit this information to a fixture in another and have that fixture perform an emergency protocol such as turning on and off repeatedly.

The cloud server 30 may maintain one or more server databases for storing information received from any of the intelligent light fixtures or any of the electronic devices for any number of users.

In one embodiment, the second electronic device 24 may be communicatively coupled to the cloud server 30 via a wireless network. For example, the second electronic device 24 and the cloud server 30 may be communicatively coupled via a personal area network, a local area network, a wide area network, a mobile device network (such as a Global System for Mobile Communication network, a Cellular Digital Packet Data network, Code Division Multiple Access network, and so on), and so on and so forth. In other embodiments, the second electronic device 24 and the cloud server 30 may be connected via a wired connection.

In one embodiment, the first electronic device 22 may be communicatively coupled to the first light fixture 18 via wireless connection. In other embodiments, the first electronic device 22 may be wirelessly connected to the second light fixture 20 or any number of other light fixtures with the fully integrated intelligent lighting module 40 installed, wirelessly. For example, the first electronic device 22 may be configured to transmit signals to the first light fixture 18 using any wireless transmission medium, such as. WiFi, radiofrequency, microwave, or other electromagnetic medium.

The fact that the module 40 is capable of connecting to the Internet means that it has access to a wide variety of information. Software or firmware programmed into the module will allow it to use this data to effect lighting performance. By way of example, the module may gain access to the price of electricity during different times of the day through the internet. It may then use this information to aid in conserving resources by dimming fixtures during peak hours.

In another embodiment, the first electronic device 22 may be configured to receive and record data transmitted from the first light fixture 18, the second light fixture 20, or any other light fixture. The data may correspond to one or more executable commands or macros that may be executed on the first electronic device 22. For example, the first light fixture 18 may tell the first electronic device how long that fixture has been running and whether a bulb or diode needs to be replaced.

In yet another embodiment, the first light fixture 18, or any other light fixture or with a fully integrated intelligent lighting module 40 installed, may wirelessly transmit data to the cloud 30 to be accessed by an electronic device which may be a wireless communication device, such as a cellular mobile phone, lap-top, or desktop computer capable of connecting to the server 30 or any of said light fixtures.

FIG. 1 illustrates one embodiment of the fully integrated intelligent lighting module 40 that may be used to enable a standard or "dumb" light fixture to perform the tasks illustrated in FIG. 8. As shown in FIG. 1, the fully integrated intelligent lighting module 40 may include an external heat sink 12, several external sensor ports 14, as well as a digital display 10. The intelligent lighting module 40 may also include output ports or additional input/output ports for establishing a wired connection with other electronic devices are modules. In other embodiments, these electronic devices or modules may be wirelessly connected to the intelligent lighting module 40.

Figure 2:
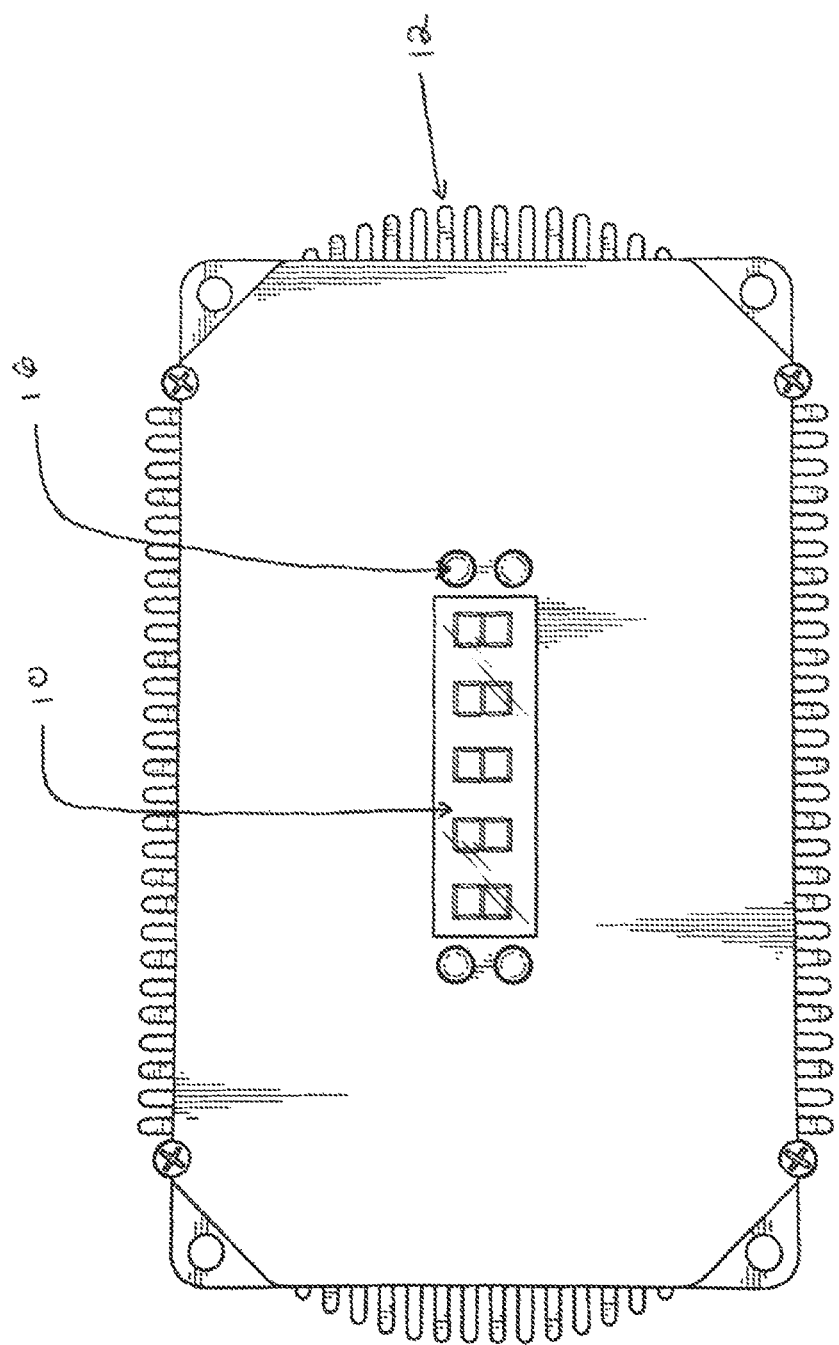
FIG. 2 shows a top view thereof.
Figure 3:
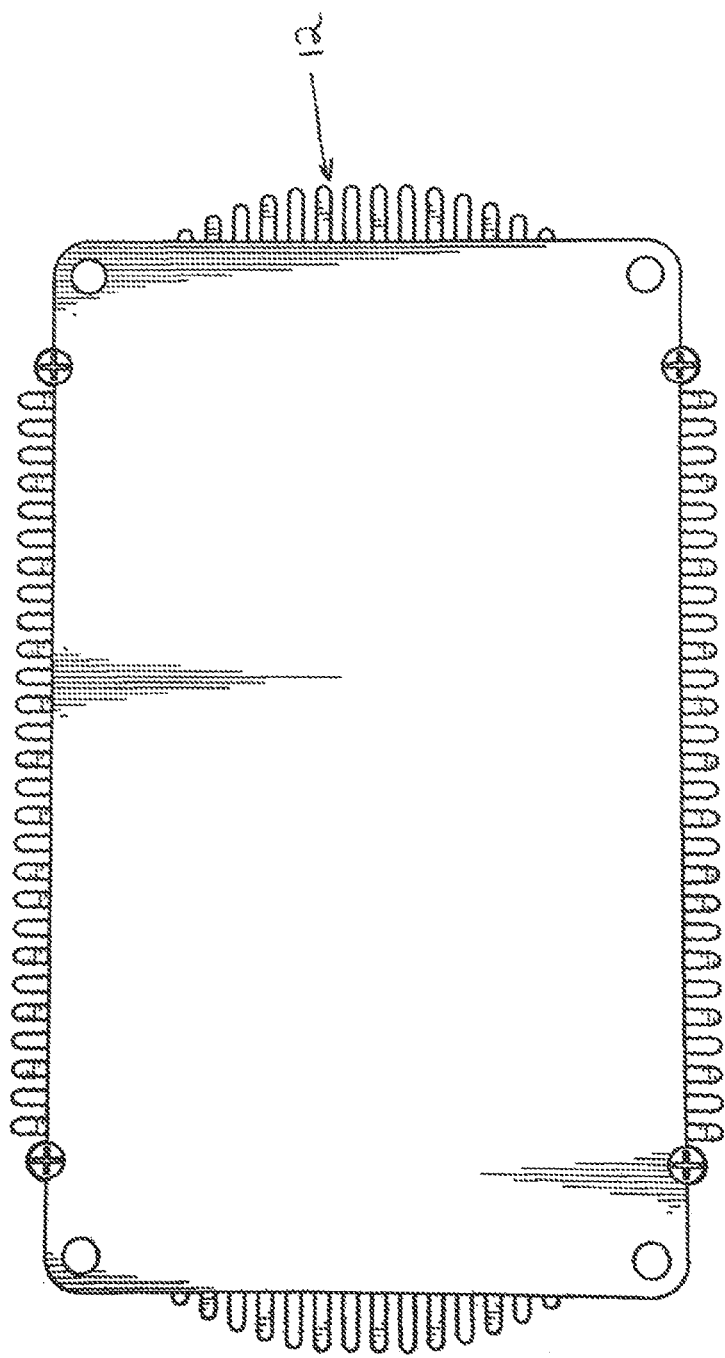
FIG. 3 shows a bottom view thereof.
Figure 4:
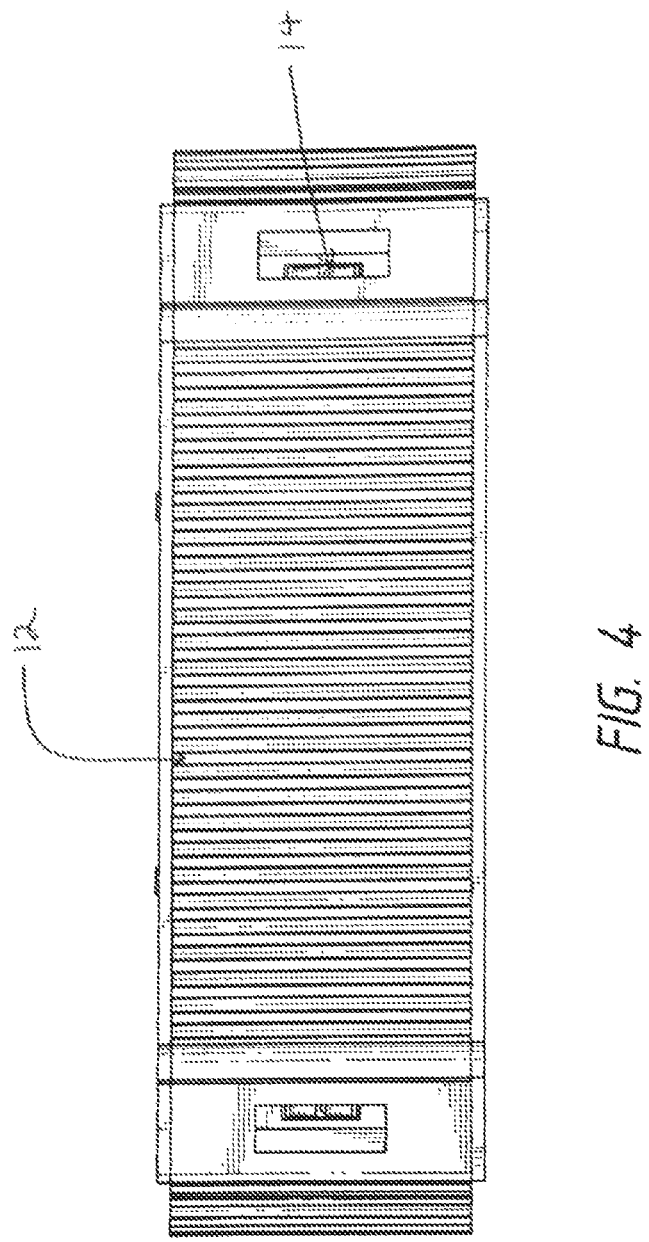
FIG. 4 shows a left-side view thereof.
Figure 5:
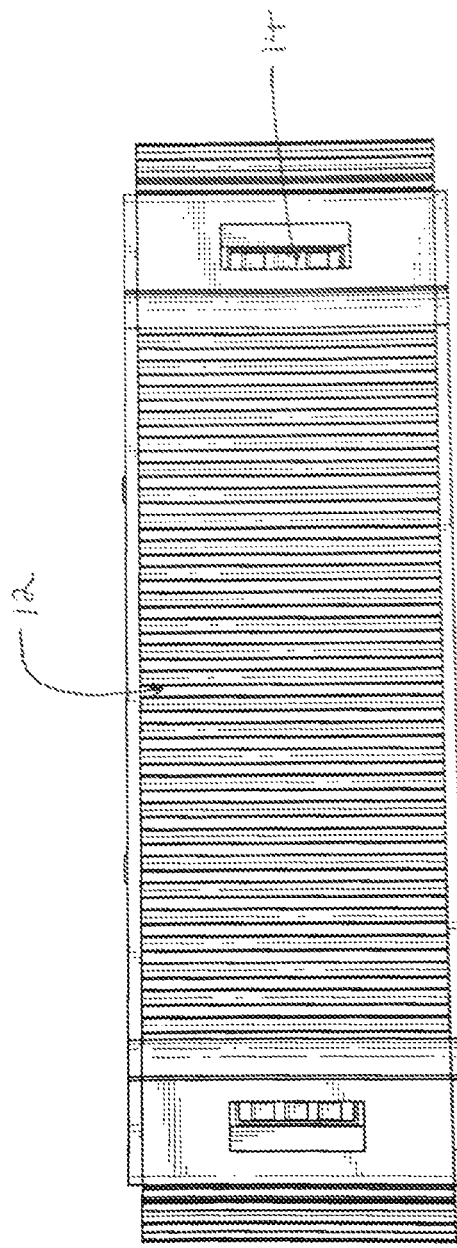
FIG. 5 shows a right-side view of thereof.

Referring to FIG. 2, in one embodiment of the fully integrated intelligent lighting module 40, set module comprise a series of buttons 16 on the outside case. These buttons will allow a user to access the data and input commands directly into the intelligent light module 40. The data that the module 40 outputs may be read on the external display 10. By way of example, the user may input a command using the external control buttons 16 asking the intelligent light module 40 how many hours a particular fixture has been on. The number of hours may then appear on the module's external display 10.

Furthermore, the external control buttons 16 may be used to program commands into the intelligent light module. In one instance, a user may wish to program the intelligent light module and corresponding fixture to turn on or off at a particular hour. This may be done using the external display 10 and control buttons 16. One of ordinary skill in the art will understand that the display in corresponding buttons may be used to perform a wide variety of functions and are not limited to those herein described.

In one embodiment, the sensor connected to the external sensor port 14 may be a microwave sensor. Said microwave sensor may be capable of detecting the presence of an individual should they come within a predetermined distance from the intelligent lighting module 40. This information may then be stored on the module and transmitted wirelessly to an electronic device and/or a cloud server 30. The intelligent light module 40 may also receive and execute commands regarding when said microwave sensor should be activated or disengaged. In one embodiment, these commands may come from the first electronic device 22, the second electronic device 24, or the third electronic device 26.

In another embodiment of the integrated intelligent lighting module 40, the microwave sensor may be integral and located within the module 40 instead of being plugged into the external sensor port 14.

Figure 9:
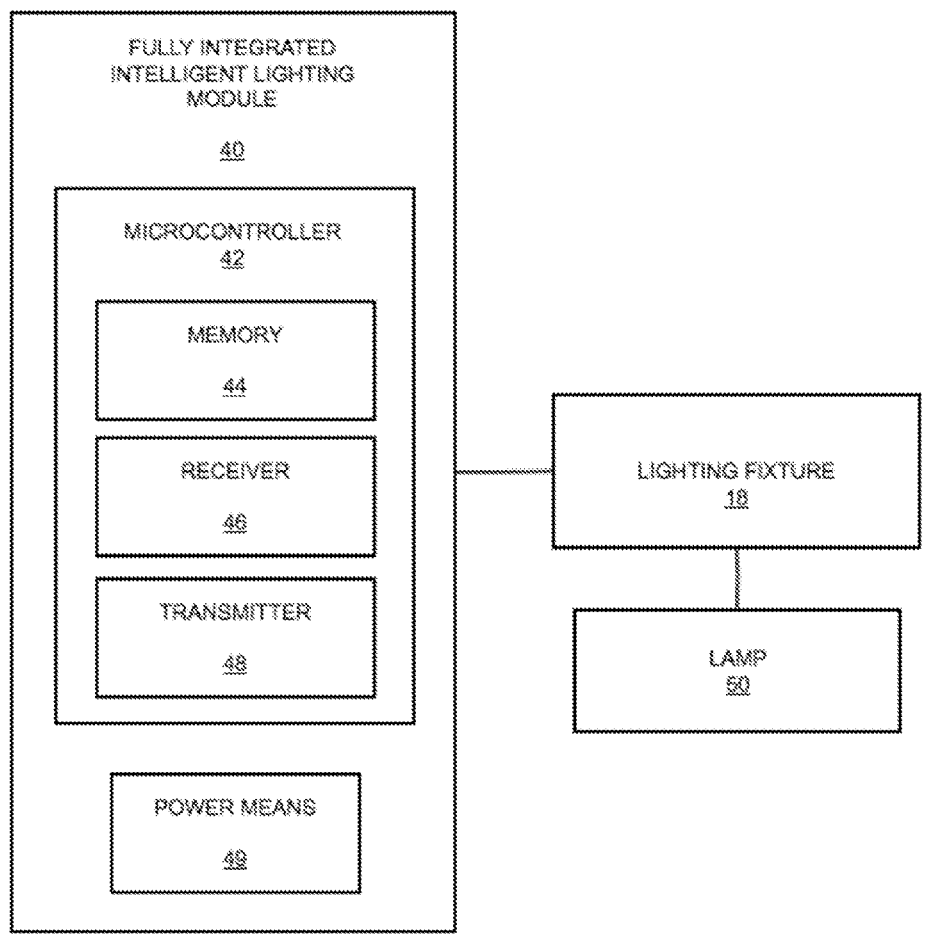
FIG. 9 is a block diagram of intelligent lighting module electrically coupled to a light fixture.

FIG. 9 illustrates a block diagram of one embodiment of the fully integrated intelligent lighting module 40 electrically coupled to one of the possible lighting fixtures 18, having within the intelligent lighting module 40 a processing device capable of transmitting and receiving electronic data files and a power means 49 for supplying power to the lamp 50 and lighting fixture 18. Said device may be any of the commercially available products capable of processing such lighting command files as well as, storing in memory 44, receiving via a receiver 46, and transmitting, via a transmitter 48 the same. Thus, said device may be, but is not limited to, a microcontroller 42 such as an IEEE802.15.4 standard-compatible integrated radio frequency (RF) transceiver and wireless microcontroller. Such a microcontroller may have Low-power, IP-based wireless connectivity enabled by open source networking software, such as that sold under the trademark JENNET-IP™, or other low powered communications protocols, such as those sold under the trademark ZigBee®.

The first, second, and third electronic devices may be configured to receive one or more lighting commands from the user and convert the commands into an electric signal through the use of a proprietary software. The electric signal may be stored as a command file on the electronic device. The command file may be in a format supported by the device, such as a .doc file or .exe file for example.

All of said electronic devices may be capable of transmitting the command files to the cloud server 30 or directly to a particular lighting fixture with the intelligent lighting module 40 installed. In one embodiment, the command files may be stored on the cloud server 30 and/or the intelligent lighting module 40. The cloud server 30 is capable of transmitting the stored command files to any light fixture with a intelligent lighting module 40 installed.

In one embodiment, the third electronic device 26 may be operated by a smart licensor. In this embodiment, various user input controls of light fixtures with the fully integrated intelligent lighting module 40 installed will only be available to the smart licensor. By way of example and for illustration purposes only, the smart licensor may have the ability to override all of the lighting commands made by any other electronic device. So if a user of the first electronic device 22 (in this example, the first electronic devices being operated by a smart licensee) requests that the light fixtures be turned on during certain hours of the day, the smart licensor will have the ability to override that command and turn off all of the light fixtures which were originally programmed to turn on. This function will be performed by a proprietary software found only on the third electronic device 26 or through the use of a specific login and password combination unique to the smart licensor. This is because the smart licensor will have licensed the fully integrated intelligent lighting modules 40 to the smart licensee. If the smart licensee violates any of the terms or conditions of his/her license agreement, the smart licensor 26 may have the ability to take control of their smart fixtures.

It should be understood by those having ordinary skill in the art that the second electronic device 24 may also be used by the smart licensee. However, only the smart licensor 26 shall have control over the third electronic device.

CONCLUSIONS, RAMIFICATIONS, AND SCOPE

While a particular form of the invention has been illustrated and described, it will be apparent that various modifications can be made without departing from the spirit and scope of the invention. For example, the lighting module is described as being compatible with LED light fixtures even though the inventors contemplate the possibility that the module may be used with already existing electrodeless discharge lamps and plasma lamps as well. Accordingly, is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being refined herein to be restricted to any specific characteristics, features, or aspects of intelligent lighting module with which that terminology is associated. In general, the terms used in the following claims should not be constructed to limit the fully integrated intelligent lighting module to the specific embodiments disclosed in the specification, unless the above Detailed Description section explicitly define such terms. Accordingly, the actual scope encompasses not only the disclosed embodiments, but also all equivalent ways of practicing or implementing the disclosed intelligent lighting module. The above detailed description of embodiments of the lighting module is not intended to be exhaustive or limited to the precise form disclosed above or to a particular field of usage. While specific embodiments of, and examples for, the module are described above for illustrative purposes, various equivalent modifications are possible which those skilled in the relevant art will recognize.

While certain aspects of the fully integrated intelligent lighting module are presented below in particular claim forms, the inventors contemplate the various aspects of the intelligent lighting module in any number of claim forms. Accordingly, the inventors reserve the right to add additional claims after filing the application to pursue such additional claim forms for other aspects of the intelligent lighting module.

What is claimed is:

1. A fully integrated intelligent lighting module allowing a light fixture to receive information and communicate wirelessly with other fixtures, the module comprising:
   a power means to provide electricity to said fixture; and
   a micro controller to enable wireless energy-management;
   wherein the module is electrically coupleable to any existing conventional lighting fixture;
   wherein, when coupled to any conventional lighting fixture, the module is operative to receive and store data associated with a lamp electrically coupleable to the lighting fixture;
   wherein the module is operative to transmit any data received and/or stored from a lamp electrically coupled to the lighting fixture to at least one of another fully integrated intelligent lighting module electrically coupled to another lighting fixture and an electronic device communicatively coupled to the module; and, and wherein the module is operable to receive, store, and transmit data via the lighting fixture independent of the type of lamp coupled thereto.

2. The intelligent lighting module of claim 1 further comprising a sensor.

3. The intelligent lighting module of claim 2 wherein said sensor is a microwave sensor.

4. The intelligent lighting module of claim 2 wherein said sensor is a motion sensor.

5. The intelligent lighting module of claim 1 further comprising a heat sink formed along an external surface of the intelligent lighting module.

6. The intelligent lighting module of claim 1 wherein the module is further configured to receive information from an electronic device in wired communication with the module, enabling the functionality of the module to be upgraded or altered as desired over time.

\* \* \* \* \*